ELECTRONIC ENGINE SPEED CONTROL SYSTEM

Original Filed Aug. 27, 1947 3 Sheets-Sheet 1

INVENTOR.
Franklin F. Offner
BY Pierce, Scheffler & Parker.
Attorneys

ELECTRONIC ENGINE SPEED CONTROL SYSTEM

Original Filed Aug. 27, 1947 3 Sheets-Sheet 2

INVENTOR.
Franklin F. Offner.
BY Pierce, Scheffler & Parker
Attorneys

April 12, 1960 F. F. OFFNER Re. 24,809

ELECTRONIC ENGINE SPEED CONTROL SYSTEM

Original Filed Aug. 27, 1947 3 Sheets-Sheet 3

INVENTOR.
Franklin F. Offner.
BY Pierce, Scheffler & Parker
Attorneys

United States Patent Office

Re. 24,809
Reissued Apr. 12, 1960

24,809

ELECTRONIC ENGINE SPEED CONTROL SYSTEM

Franklin F. Offner, Chicago, Ill.

Original No. 2,662,372, dated December 15, 1953, Serial No. 770,872, August 27, 1947. Application for reissue May 23, 1955, Serial No. 510,597

28 Claims. (Cl. 60—39.28)

Figure 1:
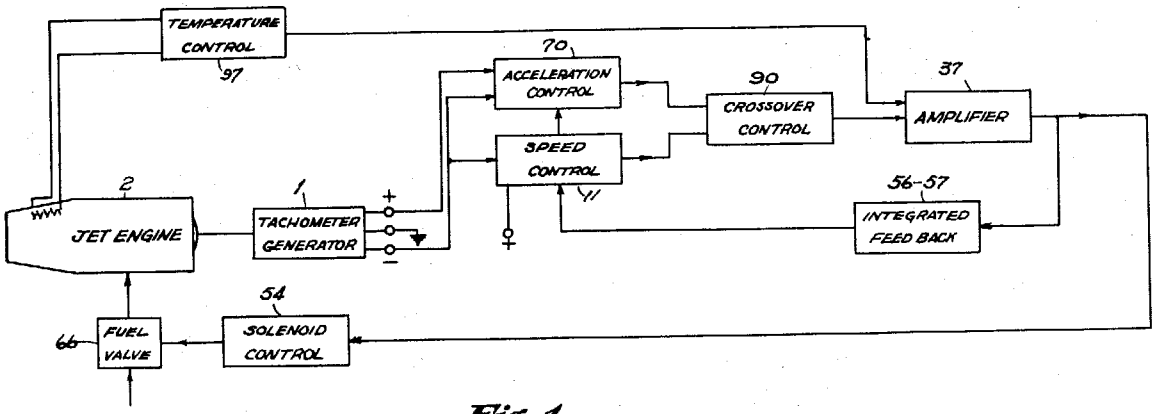

Matter enclosed in heavy brackets [ ] appears in the original patent but forms no part of this reissue specification; matter printed in italics indicates the additions made by reissue.

This invention relates to electrical control systems and in particular to systems of the null-seeking type for controlling the magnitude of a variable in accordance with a reference standard.

The invention is considered to be of general utility and the particular nature of the variable to be controlled will acordingly depend upon the type of apparatus to which the invention is applied. Thus depending upon the apparatus, the variable may be temperature, pressure, liquid level, speed, etc. The invention is well suited for speed control of rotating members such as engines and other types of power plants and is herein illustrated and described in its application to engines of the jet propulsion type. However, it is to be understood that the invention is not limited to this particular application but is deemed to also cover such modifications and uses as come within the scope of the invention as expressed in the appended claims.

An object of the invention is to provide an improved electrical control system of the null-seeking type in which a direct current voltage variable in proportion to the magnitude of the variable to be controlled is continually compared with another direct current voltage but which is of constant magnitude that serves as a standard or reference voltage; any deviation in the variable from the magnitude desired to be maintained brings about a corresponding change in the variable voltage and the resulting difference between the latter and the reference voltage serves as a voltage signal that is first amplified and then applied to the control device, by which the magnitude of the variable is controlled, in such manner as to remove the deviation and reestablish a balance between the variable and reference voltages.

Another object of the invention is to provide for automatically controlling the rate at which an engine is accelerated from idling to various running speeds and in such manner that the acceleration rate is automatically increased as the speed of the engine increases. In the case of jet engines, this is particularly important to prevent overheating of the turbine, combustion chamber, and exhaust nozzle components especially at low speeds where the amount of air available for cooling the parts is limited.

Another object is to provide an adjustable engine speed control of the null-seeking type which introduces an additional control quantity variable with another variable of the engine such as for example engine temperature or altitude by which the speed of the engine is automatically changed in accordance with predetermined changes in the variable irrespective of the nature of the relation between the engine speed and reference quantities.

Another object is to provide for automatically decreasing the speed of an engine in the event that its temperature exceeds a preselected maximum value considered safe for normal operation.

Yet another object of the invention is to regulate fuel flow to the engine as a function of engine speed so as to place a limit on the rate of fuel flow to be permitted for each different speed of the engine.

Another object of the invention is to provide an improved electronic amplifier for extremely low direct current voltages.

The foregoing and other objects and advantages to be derived from the invention will become more apparent from the following description and accompanying drawings which illustrate the invention as applied to jet engines.

Figure 3:
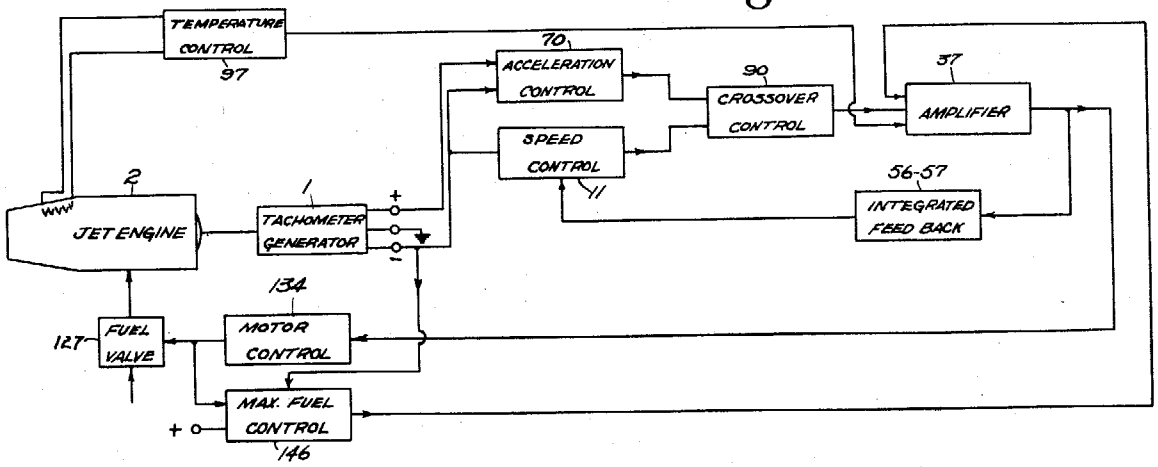
Figure 4:
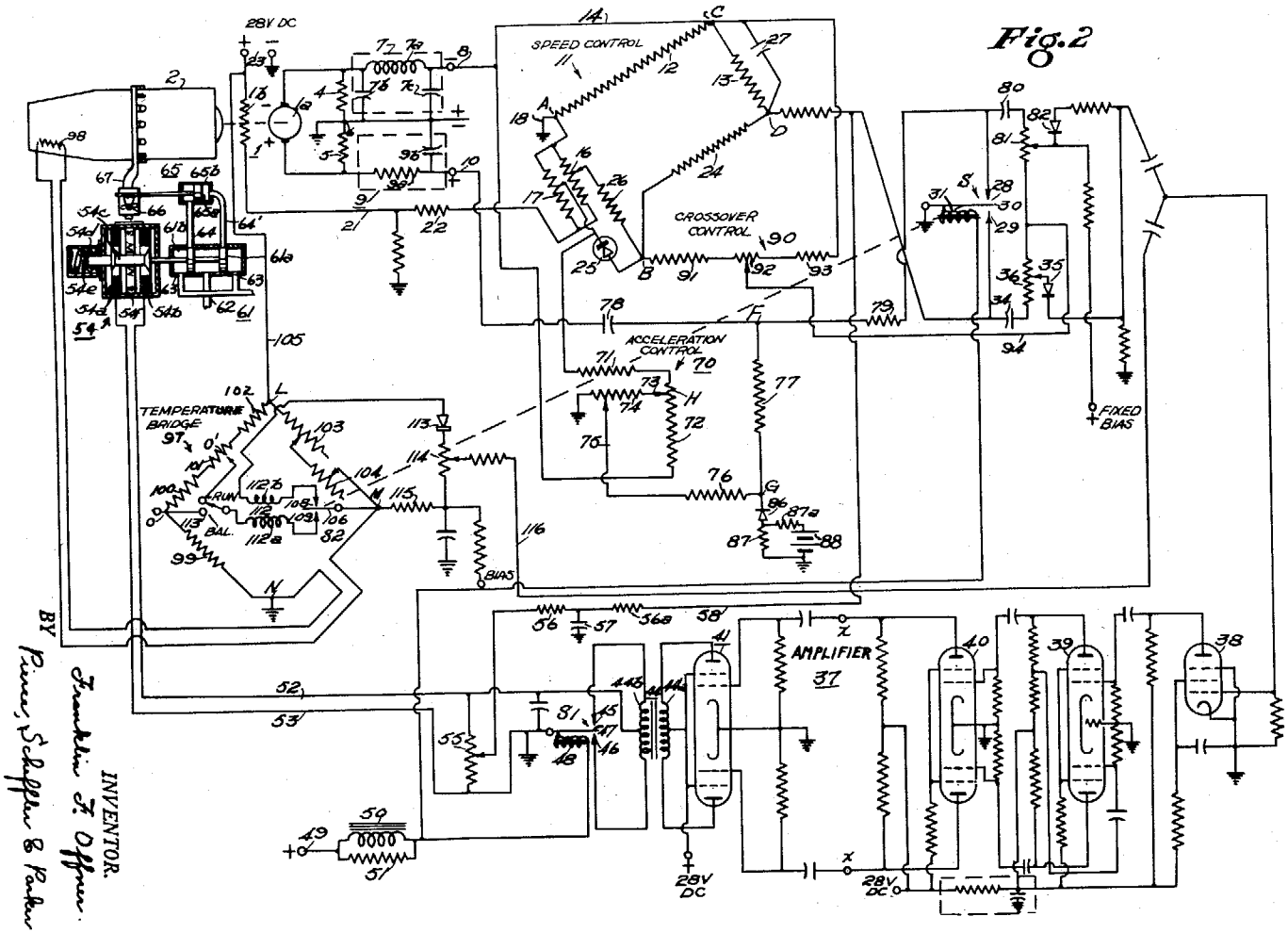
Figure 5:
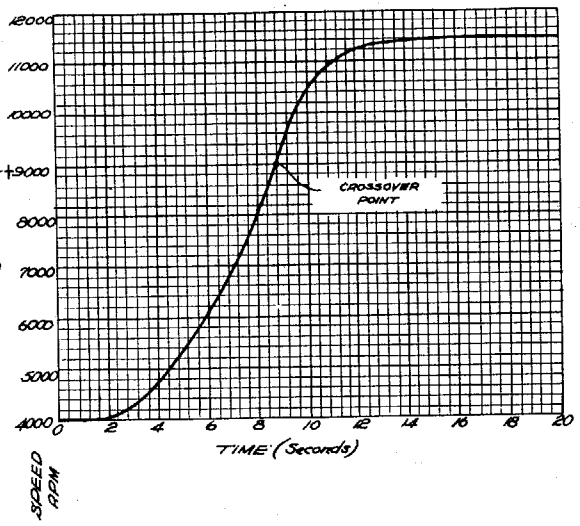
Figure 4:
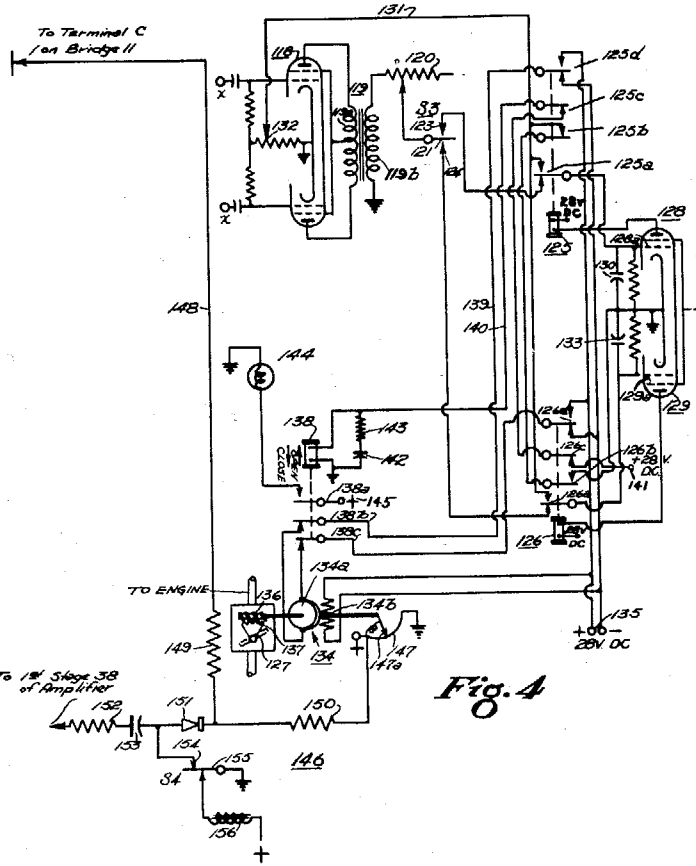

In the drawings, Fig. 1 is a block diagram showing the principal control components of a preferred embodiment of the control system; Fig. 2 is a schematic circuit diagram of the system shown in Fig. 1; Fig. 3 is another block diagram illustrating a modified form of the invention; Fig. 4 is a schematic circuit diagram of the modified embodiment shown in Fig. 3; and Fig. 5 is a speed-time curve illustrating a typical speed change characteristic of the engine as established by the control system in accordance with this invention.

Referring now to Figs. 1 and 2, it will be seen that the control system includes a small generator 1 having an armature 1a coupled by shafting to the jet engine 2 so as to be driven by the latter at a speed proportional to that of the engine. The output voltage from armature 1a which will vary with its speed is split by a voltage divider comprising series connected resistors 4, 5 which are grounded at the junction 6 therebetween into relatively positive and negative potentials. The negative potential appearing across resistor 4 is passed through a filter 7 of the LC type comprising inductance 7a and condensers 7b, 7c to the negative voltage terminal 8. The positive potential appearing across resistor 5 is passed through a filter 9 comprising resistance 9a and condenser 9b to the positive voltage terminal 10. Filters 7 and 9 serve to remove commutator ripples and unwanted voltage frequencies caused by engine torsional vibrations and hence a steady direct current potential is delivered to the speed voltage terminals 8 and 10. The potential at terminal 8 will be "negative" with respect to the ground connection; the potential at terminal 10 will be "positive" with respect to ground; and the two potentials will vary in proportion to the speed of the engine 2.

For setting the engine 2 to run at not less than a preselected minimum speed, and for also adjusting the control system to operate at various stabilized cruising speeds, a bridge circuit 11 is provided. The latter includes resistor arms 12, 13 having the junction point C therebetween connected via lead 14 to the negative speed voltage terminal 8. Also included in the bridge are two parallel connected slide wire potentiometers 16, 17. One terminal of each of the latter is grounded at 18 and the other terminal of each is connected via lead 21 through resistor 22 and the field 1b of the engine driven generator 1 to the positive terminal of a source of direct current voltage 23, the negative terminal of this voltage source being grounded as shown by the conventional symbol. The voltage source 23 supplies a "reference" voltage to the potentiometers 16 and 17, and the latter serve respectively as a speed selector control adjustable by the operator to vary the cruising speed of the jet engine, and as a minimum speed control which is preset to fix the minimum engine speed to be permitted.

By examination of the circuit in which the field coil 1b of the tachometer generator 1 is connected in series with the parallel arranged speed control potentiometers 16, 17, it will be evident that any fluctuation in the voltage source 23 is reflected equally in the generator field on the speed control potentiometers. Thus, for example, should the supply voltage decrease, it will lower the reference voltage at the potentiometers 16, 17 but it will also correspondingly lower the negative and positive speed signal voltages appearing at terminals 8 and 10. As operation of the control system depends upon a balance between the signal and reference voltages taken from the potentiometers 16, 17, for any speed, the advantage of the interconnections between the generator field and potentiometers is obvious for since both the signal and reference voltages will vary an equal amount there will be no variation in balance, and therefore engine speed, regardless of any reasonable change in the D.C. supply voltage.

The bridge 11 is completed by another resistor arm 24 having the same resistance value as arm 13 that is connected between an end terminal D of resistor 13 and one side of a rectifier 25 to which the slidable contact arm on potentiometer 16 is also connected through a resistor 26. The other side of rectifier 25 connects with the slidable contact arm on the minimum speed control potentiometer 17. The convention observed with respect to the rectifier 25 as illustrated is that electron flow is in the direction of the arrow.

The bridge 11 functions to compare the relative magnitudes of the negative speed voltage from generator 1 and the reference voltage (which is positive) as set on the two potentiometers 16 and 17, and to deliver a potential at point D on the bridge whose sense (i.e. positive or negative) and magnitude will be proportional to the sense and magnitude of the difference between the speed and reference voltages. A damping condenser 27 connected between points C and D of the bridge 11 differentiates the negative speed voltage. This derivative voltage is applied at terminal D and serves to prevent the control system from overshooting at the engine speed set on potentiometer 16 when the engine is accelerated from an idling speed. It also serves to reduce any "hunting" effect at the selected engine speed.

The minimum speed control potentiometer 17 and the cruising speed control potentiometer 16 function conjointly with the rectifier 25 to furnish the positive reference voltage to the bridge 11. If the voltage setting of potentiometer 16 is positive with respect to the setting of potentiometer 17, rectifier 25 will not conduct and consequently, the positive reference voltage to be compared with the negative speed voltage by bridge 11 will depend upon the setting of potentiometer 16. However, should the take-off voltage at potentiometer 16 be less positive than that of potentiometer 17, then current will flow through rectifier 25 and the reference voltage applied to the bridge will depend solely upon the setting of the minimum speed control potentiometer 17.

The direct current signal output at point D denoting a difference between the instant speed at which the engine 2 is running and a desired speed as represented by the magnitude of the reference voltage, is interrupted by means of a vibrator type of switch S which includes stationary contacts 28, 29 and a grounded vibrating reed contact 30 therebetween driven by a vibrator coil 31. The signal voltage from point D is periodically grounded through stationary contact 29 and reed contact 30 producing a square wave signal, the alternating component of which is passed through condenser 34 and applied to one plate of a unidirectional conducting device 35 that can be a disc rectifier of the selenium type, through an adjustable tap on resistor 36. Rectifier 35, depending upon its bias, will either block the signal or allow it to pass to the input of the signal amplifier 37. The convention observed with respect to the rectifier 35 and also with respect to rectifier 82 to be subsequently explained is that electron flow is in the direction of the arrow. The manner in which the rectifier bias, referred to as the "crossover voltage" is derived, is described later in another section.

Assuming that the bias on rectifier 35 is such as will pass the voltage signal coming from point D on bridge 11 into the amplifier 37, the signal is amplified in a high gain pentode single ended amplifier stage 38, a phase inverter stage 39, and two push pull stages 40, 41. The amplified square wave signal is then passed to the primary 44a of output transformer 44. The output in the transformer secondary 44b is rectified back into a direct current signal through vibrator switch S1 comprising stationary contacts 45, 46, connected to the opposite ends of the secondary winding 44b and vibrating blade contact 47 driven from coil 48. The contacts of the switch S1 may be structurally combined with those of switch S so that both blade contacts 30 and 47 are driven by one coil and therefore operate synchronously. However, synchronous operation of the two switches may also be obtained in the manner shown in the drawings by making the switches structurally independent and synchronizing them electrically. Coils 31 and 48 of the two structurally independent vibrators S and S1 are connected to the positive terminal 49 of a direct current voltage source and operate synchronously through the agency of a choke coil 50 and resistor 51 combination. The amplified direct current signal is applied via connections 52, 53 to the series connected coils 54a, 54b of a proportional solenoid 54.

A fraction of the amplified output signal taken across resistor 55 and integrated by resistor 56 and condenser 57 is fed back through resistor 56a and connection 58 to the output side of the speed control bridge 11 and combines with the latter to further improve the stability of the system. The feed-back signal is always opposite in polarity to that of the speed signal which developed it and hence adds to the stabilizing effect of condenser 27 in reducing any tendency on the part of the system to "hunt" above and below any selected value engine speed.

Armature 54c of the proportional solenoid, biased to a neutral position by springs 54d, 54e operates the piston member 61a of a pilot valve 61. Cylinder 61b of the valve contains a central high pressure fluid inlet 62, low pressure outlets 63 at each end lead to a sump, and high pressure fluid outlets 64, 64' leading to the opposite ends of the cylinder 65b of servomotor 65. The piston 65a of the servomotor actuates a vane 66 in the fuel injection line 67 leading to engine 2 to control the rate of fuel flow to the combustion chamber.

The proportional solenoid 54 also includes a toroidal permanent magnet 54f, for setting up a magnetic field which when combined with the magnetic field produced electromagnetically by the signal current in coils 54a, 54b, produces axial movement of armature 54c in one direction or the other from its neutral position fixed by the loading springs 54d, 54e dependent upon the sense of the current flow through these coils which in turn depends upon the polarity of the rectified output signal at vibrator S1.

The corresponding motion imparted to valve piston 61a places the high pressure line 62 in communication with one end of cylinder 65b of servomotor 65 and the other end of cylinder 65b in communication with one of the low pressure outlet lines 63 causing servomotor piston 65a to shift axially and change the setting of the vane 66 in the fuel injection line 67. Movement of armature 54c in the opposite direction from its neutral position in response to an output control signal of opposite polarity will of course have an opposite effect on the setting of the fuel control vane 66.

The proportional solenoid 54 is of a type for which a more detailed explanation of its construction and principles of operation may be found in my co-pending application, Ser. No. 68,862, filed January 3, 1949, and the application of Stanley G. Best filed October 28, 1947, now Patent No. 2,579,723.

As the speed of the engine 2 is increased or decreased as the case may be by a change in the setting of the fuel control vane 66, the negative speed voltage at terminal 8 will undergo a like change until it rematches the new setting of the speed control potentiometer 16 which gave rise to the signal that led to the change in engine speed, at which time the signal from bridge 11 will be reduced to zero. Thus the system operates on the well known null principle.

In the jet type of engine, it has been found necessary to place a limitation on the maximum rate at which the engine is to be permitted to be accelerated, especially when bringing the engine up from idling to a selected cruising speed in order to prevent the temperature of the blading of the turbine element as well as that of the combustion chamber of the engine from reaching dangerously high levels. An acceleration control circuit 70 serves this function and produces an acceleration rate signal which automatically increases exponentially with the speed of engine 2. At low engine speeds, the amount of air taken in by the engine is quite small. Hence the cooling effect derived from this air for the turbine and combustion chamber is correspondingly of a low order. However, as the engine speed is increased, the increased air flow at the higher speeds allows a greater amount of engine torque output to be generated without overheating, which consequently permits of a greater acceleration rate. The acceleration circuit 70 operates below the "crossover speed" as determined by a "crossover circuit" to be later explained. Above the "crossover speed," the acceleration control is rendered inoperative and the speed control 11 takes over.

Included in the acceleration circuit are resistors 71 and 72 connected in series between the negative speed voltage terminal 8 and the adjustable contact arm on potentiometer 17. Resistor 72 is provided with an adjustable tap 73 to which is connected one end of resistor 74, the other end of the latter being grounded. Resistor 74 together with an associated adjustable tap 75 constitute a potentiometer for taking off a suitable fraction of the voltage existing between the tap point H on resistor 72 and ground. The voltage take off from tap 75 which as hereinafter explained will be negative is applied through resistors 76, 77 to a circuit junction point F where it is combined algebraically with a positive acceleration signal voltage developed by differentiating the positive speed voltage signal appearing at a terminal 10 at condenser 78 to produce the accelerator signal. From junction F, the acceleration signal is passed through resistor 79 to contact member 28 on vibrator switch S.

As with the speed control circuit previously explained, the D.C. acceleration signal is converted by the vibrating grounded arm 30 into a square wave signal, the alternating component of which is applied through condenser 80 and an adjustable tap on resistor 81 to one side of a rectifier 82. Provided the bias on rectifier 82 is of the proper polarity, which is determined by the voltage of the cross-over circuit, the acceleration signal will be passed through it into the input of amplifier 37.

Assuming now that the engine is idling and it is desired to bring it up to a selected stabilized speed, speed control 16 is advanced to a selected speed and the tap on resistor 72 adjusted to provide a small negative voltage at point H and hence also at point F. At this time the crossover voltage will be such as to allow the small negative signal to pass through amplifier 37 and thence to the fuel control valve to cause the latter to open slightly and therefore increase the engine speed slightly.

It should be noted at this point that because of the 180° relative phase reversal in the signal input and output circuits of the amplifier at the vibrators S and S1 which function to alternately chop the speed and acceleration signals at the amplifier input, the polarities of the two signals must be the reverse of each other to effect a like change in the setting of the fuel control valve. In the illustrated construction, a positive signal at the output of the bridge 11 results in an increase in fuel flow to the engine and hence the acceleration signal to obtain the same result must be negative. The system can of course be reversed so that negative signals from bridge 11 and positive signals from the acceleration circuit 70 result in an increase in fuel flow.

As the engine speed increases, the negative voltage at point H increases and hence the voltage at point F will become more and more negative as it continues to combine algebraically with the dervative of the positive speed signal from condenser 78 resulting in higher and higher negative acceleration signal voltages which in turn result in an increasingly greater acceleration rate in the engine. The change in voltage at point F is thus an exponential one and the initial rate of acceleration is determined by the setting of resistors 72 and 74, a greater initial negative voltage at point H resulting in higher initial acceleration.

The acceleration curve produced by the acceleration circuit 70, assuming the fuel vane 66 operates quickly enough to keep the input always substantially in balance, is $$\frac{d\omega}{dt}=A(B\omega-\omega_{min})$$

where $\omega$ is the engine speed, B is a constant determined by the setting of the initial accelertion control resistor 72, and A is a constant determined by the setting of the acceleration rate increase control potentiometer 73.

It should be noted that should the negative speed voltage at terminal 8 drop enough below the minimum speed setting that point H became positive, the input signal to amplifier 8 would be such as to call for a deceleration whereas an acceleration is desired. To prevent this from occurring, a small negative voltage is inserted at point G between resistors 76 and 77 through a rectifier 86, resistors 87 and 87a and battery 88.

The bias voltage for rectifiers 35 and 82 which determines whether or not the signals from the speed control circuit 11 or the acceleration control circuit 70 shall pass to the input of the amplifier 37 is obtained from a control unit 90 which for convenience can be called the "crossover circuit." This circuit, which acts as a switching device to fix the point in the speed curve of engine 2 at which the amplifier input signal changes over from the acceleration control 70 to the speed control 11, is comprised of resistors 91, 92 and 93 connected in series between points B and C of the speed control bridge 11. Resistor 92 has an adjustable tap and a lead 94 extends from the latter to a point intermediate resistors 36 and 81.

It will be recalled from the previous description that the alternating components of the square wave speed and acceleration signals are passed by the condensers 34 and 80, respectively. The bias voltage from the crossover circuit applied over lead 94 to a point intermediate the resistors 36 and 81 is superimposed upon the signals passed by condensers 34, 80. If the crossover voltage appearing at the input side of rectifier 35 is negative, current can flow only through this rectifier into the input circuit of amplifier 37, and such current will fluctuate in accordance with the alternating component of the speed signal. Conversely when the crossover voltage becomes positive, current can flow only through rectifier 82 into the amplifier input and such current will fluctuate in accordance with the alternating component of the acceleration signal. It should now be clear that the rectifiers 35 and 82 function as switching means which pass or block the speed and acceleration signals, respectively in dependence upon the polarity of the crossover voltage.

At speed circuit balance, the potential at the tap of resistor 92 will be slightly negative. This negative potential applied to rectifiers 35 and 82 will permit any signals from the speed control circuit 11 to pass through rectifier 35 but is sufficient to cut off at rectifier 82 any signals coming from the acceleration circuit 70. If the speed control potentiometer 16 is advanced to raise the positive reference potential, the crossover voltage at the point between resistors 36, 81 will become positive which then cuts off rectifier 35 and allows only the acceleration signals from circuit 70 to pass through rectifier 82 to the input of amplifier 37; this condition prevails until the engine speed is sufficiently high, at which point the crossover voltage cuts off rectifier 82 and allows only the signals from the speed circuit 11 to pass into amplifier 37 through rectifier 35. When the engine is to be reduced in speed by retarding potentiometer 16, the crossover voltage will become more negative and the signals from bridge 11 control the engine speed.

The control circuit as shown in the drawings has been applied to jet engines of the type known as Model J-33-17 and a number of test runs made. A speed-time curve for a typical run is shown in Fig. 5. It will be noted from this curve that in the initial stages of the increase in engine speed, the change in the engine acceleration, denoted by the tangent to the curve at any point, was held down. After a run of two seconds, however, the curve begins to rise increasingly more steeply which is indicative of increasingly greater engine acceleration until at the end of 8.8 seconds the engine reached the "cross-over" point at a speed of 9000 revolutions per minute. At this point, the negative signals from the acceleration circuit 70 became blocked by rectifier 82, and the positive signals from the bridge 11 took over to control the remaining increase in engine speed until final speed balance, as determined by the setting of potentiometer 16, was attained. It will be noted that at an engine speed of 10,500 r.p.m., the curve begins to taper off at an increasing rate as a result of the damping action provided by condenser 27, the engine reaching the selected and stabilized final speed of approximately 11,450 r.p.m. after a run of approximately sixteen seconds.

In operating engines of the jet type, it has been found that some control should be maintained over the maximum temperatures considered permissible in the tail pipe 2a from which the hot propulsion gases are expelled. The present electronic type of engine control is well suited for this purpose and tail pipe temperature limitation is obtained by superposing a signal voltage variable with the temperature on the control signals supplied by the speed and acceleration circuits 11, 70 at the input to amplifier 37. The polarity of the signal is such that when a preselected critical temperature in the tail pipe is exceeded, the fuel vane 66 will be moved towards a more closed position thus reducing the fuel input to the engine which in turn is reflected by the desired decrease in temperature of the propelling combustion gases at the tail pipe.

Limitation of the tail pipe temperature is derived from a temperature bridge 97, that includes as one arm thereof a temperature sensitive resistor unit 98 located in the tail pipe 2a of the engine. The other three arms of this bridge are constituted by resistor 99, series connected resistors 100, 101 and 102 with an adjustable tap on resistor 101, and series connected adjustable resistors 103, 104. Point N of the temperature bridge 97 is grounded and positive potential is supplied to point L of the bridge over conductor 105 from the direct current voltage source 23. Connected in series between the bridge diagonals M and O are, another vibrator switch unit S2 mechanically coupled to the reed contact 30 on switch S so as to operate synchronously therewith comprising a central vibratory reed contact 106 and two outer stationary contacts 108, 109, the primary 112a of transformer 112 and a single pole double throw switch 113. In one position of the blade contact of switch 113 legended "balance," the transformer primary 112a is connected through to point O of the bridge, and in the other position legended "Run," primary winding 112a is connected to the tap on resistor arm 101. The transformer secondary 112b is connected in a series circuit that includes rectifier 113, resistors 114, 115, the blade contact 106 on vibrating switch S2 and stationary switch contact 108.

After the bridge 97 has been calibrated by means of the adjustable resistor arms 103, 104 with the switch 113 in the "Balance" position, the latter is thrown to the "Run" position and the tap on resistor arm 101 adjusted to a point at which the bridge 97 will become balanced at a resistance value of the temperature sensitive resistor 98 that corresponds to the maximum temperature to be permitted in the tail pipe 2a. This may be 1500° F. for example. It will now be evident that during the time that the engine 2 is being run, a temperature in the tail pipe 2a lower than the permissible maximum selected by the setting of resistor 101 will cause the bridge to become unbalanced in one direction to develop a voltage of one polarity at the bridge diagonal terminals MO′, while a tail pipe temperature higher than the selected maximum will cause the bridge to be unbalanced in the opposite direction and reverse the polarity of the voltage appearing at terminals MO′.

The direct current output voltage from bridge 97 converted into a square wave signal by the vibrator switch S2 and passed through the transformer primary 112a, induces a corresponding voltage in the secondary 112b which when contacts 106, 108 of switch S2 are closed is applied across the rectifier 113 and resistors 114, 115.

The bridge 97 is so arranged that whenever a temperature above the selected permissible maximum prevails in the tail pipe 2a, the voltage developed in the transformer secondary 112b will have such a polarity as to enable it to be passed by rectifier 113. On the other hand, should an unbalance condition in the bridge 97 be attributable to a drop in tail pipe temperature below the value at which the bridge is caused to be balanced, the voltage induced in the transformer secondary 112b will be of opposite polarity and hence be blocked by rectifier 113.

Thus for tail pipe temperature lower than the selected maximum, no signal can get through the rectifier 113, while for temperatures higher than such maximum, rectifier 113 conducts and passes the voltage signal into resistors 114, 115. This signal, taken off resistor 114 by an adjustable tap and led via conductor 116 to the input of amplifier 37, produces an output signal of such polarity as will result in a movement of the fuel vane 66 to a more closed position irrespective of the fact that at such instant the signals delivered by the acceleration circuit 70 or the speed circuit 11 may be calling for a more open position of the fuel vane 66.

A modified embodiment shown in Figs. 3 and 4 uses a relay type of control for the fuel valve and operates the latter by means of a reversible motor whose rotative direction and angular displacement is determined by the sense and magnitude of the output signals from the amplifier 37. This modified form of the control system also provides for limitation of fuel flow as a function of the speed of engine 2.

The system shown in Figs. 3 and 4 is identical with that shown in Figs. 1 and 2 up to the terminal points x—x, and hence need not be redescribed. Starting with terminals x—x, the amplified square wave signal voltages from the speed control circuit 11, the acceleration control 70, the temperature control 97, and a further signal from a fuel limitation control 146 which will be described later in more detail, are further amplified in a balanced push-pull amplifier stage 118 and passed to the primary 119a of output transformer 119. A suitable fraction of the output from the transformer secondary 119b is taken from resistor 120 and rectified by the vibrator switch S3. This switch which operates synchronously with switch S, includes a vibratory blade contact 121 mechanically coupled to the blade contact 30 on switch S and stationary contacts 123, 124. Dependent upon the circuit connections, stationary contacts 123, 124 will be correspondingly positive and negative, or reversed, with a given polarity of input signal to the amplifier 37. If a positive speed signal from the speed control 11, or a negative acceleration signal from the acceleration control 70 is received at the input to the amplifier 37, a negative signal will develop causing one of the two relays 125, 126 to open for a brief period, which in turn will cause the fuel vane 127 to open and the engine speed to increase. If the signals are reversed, the other relay opens causing the fuel vane 127 to move towards a more closed position thus decreasing the engine speed.

The coils of relays 125, 126 are connected in the anode circuits of tubes 128, 129, respectively. These relays operate normally closed, i.e. a zero or positive signal at the tube signal grids 128a, 129a will allow sufficient anode current to flow to keep the relay coils energized. However, with the appearance of a negative signal at stationary contact 123 of vibrator switch S3, condenser 130 will be charged at a rate depending upon the resistance of the pulse frequency control resistor 120. The control grid 128a will be biased negatively by the charge on condenser 130 until the anode current through tube 128 becomes sufficiently low to permit the contacts of relay 125 to open. At the moment of opening, condenser 130 with its negative charge, is connected via relay contacts 125a and lead 131 to the pulse length control resistor 132 in the grid circuit of amplifier stage 118 and allowed to discharge. Since a negative voltage already exists across resistor 132 due to the grid current of tube 118, the rate of discharge of condenser 130 will depend upon the magnitude of this voltage as well as the time constant of the RC network of resistor 132 and condenser 130. The magnitude of the voltage drop existing across resistor 132 depends in turn upon the magnitude of the signal voltage applied to the input of amplifier 37. With a large input signal, the voltage across resistor 132 will be larger and a longer time will be taken before the potential across condenser 130 is sufficiently low to allow the relay 125 to reclose. Stated in a different manner, a longer pulse length will exist with a large signal than with a small one, resulting in a greater change in engine speed per pulse with large signal because the relay will be opened longer.

Relay 126 operates in the same manner as described above for relay 125 when a negative signal appears on stationary contact 124 of the vibrator switch S3. With a no-signal condition, the anode current of tube 129 is sufficient to keep this relay energized. However, the appearance of a negative signal causes condenser 133 to charge at the rate determined by the setting of resistor 120 thus biasing the control grid 129a negatively and reducing the anode circuit current until relay 126 drops out. Condenser 133 then discharges through resistor 132 via relay contacts 126a and connection 131.

Assuming that the jet engine 2 is already running at the desired speed set on speed control potentiometer 16, no signal will appear on the vibrating blade contact 121 of vibrator switch S3 and hence the alternate engagement of this contact with the stationary contacts 123, 124 will have no change effect upon the bias on the signal grids of the tubes 128, 129.

Under such a condition, the energizing coils of both relays 125 and 126 will receive sufficient current to maintain their respective movable contact members in the positions shown in the drawing, and both brushes of the armature 134a of fuel valve motor 134 are thus connected to the negative side of a direct current source of power 135 via relay contacts 125d and 126d. No current will thus flow through the armature. The field 134b of motor 134 is separately excited by the power source 135 and with a no-current condition prevailing in armature 134a, the latter will stand still and hence not disturb the setting of the fuel vane 127 to which it is coupled by worm 136 and sector gear 137.

Should now the setting of the speed control 16 be advanced so as to cause a negative signal to appear at stationary contact 123 each time it engages the blade contact 121, the resulting charging of condenser 130 in the negative direction and its subsequent discharge will cause relay 125 to pulse open and closed at a rate determined by the in-circuit values of the charge and discharge control resistors 120 and 132 thus intermittently changing one of the motor armature connections through relay contacts 125d from the negative to the positive side of the power source 135 which causes current to flow through the armature and rotate it in such a direction as will move the fuel vane 127 to a more open position. The engine 2 will now speed up until the negative speed voltage from generator 1 matches the new setting of the speed control potentiometer 16 at which time the voltage signal at the amplifier output transformer 119 will be reduced to zero which stops the pulsing action of relay 125 allowing it to resume a closed position and stopping current flow through the armature of fuel control motor 134.

If on the other hand, the speed control potentiometer 16 is retarded which results in the appearance of a negative signal at switch contact 124 each time it is engaged by vibratory contact 121, condenser 133 is charged negatively and results in periodic deenergization and reenergization, i.e. pulsing of relay 126 thus changing the connection for the motor armature 134a through relay contacts 126d from the negative to the positive side of power source 135. Current will now be caused to flow through armature 134a in the opposite direction to rotate in the reverse direction and move the fuel vane 127 to a more closed position. Engine 2 will now decrease its speed until the reduced speed voltage matches the reduced reference voltage at potentiometer 16. At such time, the signal at output transformer 119 is once again reduced to zero allowing relay 126 to remain reenergized and cut off the flow of current in the motor armature 134a.

As a safety precaution to prevent the fuel control motor 134 from running uncontrolled should one of the relays 125, 126 fail to reclose when the signal voltage which initiated its opening disappears, a safety relay 138 is used. Contacts 138b and 138c of this relay are inserted in the connections 139, 140 between the fuel control motor armature 134a and relay contacts 125d, 126d. So long as the coil of relay 138 is energized from source 141 through the series connected relay contacts 125c, 126c, which is the condition existing when relays 125, 126 are also energized, the circuit to the motor armature 134a will remain closed through relay contacts 138b, 138c. However, in the event that either one of the relays 125, 126 should fail to properly reclose after the signal is removed, causing the energizing circuit to relay 138 to remain open at either relay contacts 125c or 126c for an undue length of time, the contacts of relay 138 will open after a predetermined length of time dependent upon the capacity of condenser 142 which discharges into the coil of relay 138 through resistor 143, and cut off the flow of current to motor armature 134a. The capacity of condenser 142 is of course made sufficiently large so that relay 138 will not open for the normal brief-period interruptions of its energizing circuit caused by normal opening operations of relays 125, 126 is response to engine speed signals transmitted through the signal amplifier 37. A pilot lamp 144 to indicate to the operator that the speed control system for engine 2 is not operating, may be provided, and is shown connected so as to be lighted from a source 145 through relay contacts 138a when the latter close upon deenergization of relay 138.

In some instances, it is desirable to limit the flow of fuel to the engine 2 as a function of engine speed. That is, to provide for a predetermined maximum flow of fuel to be permitted for each different engine speed. The control in the Fig. 4 circuit for accomplishing this, and which is designated generally by reference numeral 146 is seen to include a potentiometer 147 having its adjustable arm 147a in driving relation with the armature 134a of the fuel valve motor 134, so that the voltage output from potentiometer 147 will be a function of the angular position of armature 134a. The negative speed voltage, obtained at point C of the speed control bridge 11 and fed via conductor 148 is combined with the positive voltage taken off potentiometer 147 through resistors 149, 150 and applied to rectifier 151.

When operation of the control system is normal, the ratio of the setting of the potentiometer 147 to the negative speed voltage will be such that the two voltages always result in a negative voltage on the plate of rectifier 151. Under this condition, rectifier 151 blocks the transmission of current and hence the fuel control 146 remains inoperative. This means that the ratio of engine speed to fuel flow is high enough that fuel flow limitation is not introduced.

Should, however, the potentiometer 147 be advanced too high for the negative speed voltage at any particular speed, then the sum of the voltages will switch to a positive value and result in a signal being passed through rectifier 151 into the input to amplifier 37 through coupling resistor 152 and condenser 153. As with the other signals introduced to the amplifier, the fuel flow control signal is periodically grounded and thus interrupted through contacts 154, 155 of a vibrator switch S4 driven by coil 156 operating synchronously with the other three vibrator switches S, S2 and S3. The signal through the rectifier 151 duly appears at the output transformer 119 and is in such a phase as to function through the ensuing operation of relays 125, 126 to rotate the armature 134a of the fuel valve motor 134 in the direction as will reduce the amount of fuel flowing past vane 127 and also reduce the setting of the potentiometer 147. Thus for each speed of engine 2 there is a maximum fuel flow which is permitted. At values of fuel flows higher than the maximum, a signal is generated which reduces the flow to the permissible maximum.

In conclusion, it will be appreciated that the specific control arrangement which has been described and shown in this application may be departed from without, however, departing from the spirit and scope of the invention as defined in the appended claims. As an example, while an acceleration responsive signal is utilized to control the initial acceleration of the engine or other rotating member up to the cross-over speed, and a velocity responsive signal used thereafter to control the remainder of the change in speed desired, the basic cross-over type of control described in this application will function equally as well to effect the switching of voltage signals derived as functions of parameters of engine operation other than the velocity and acceleration characteristics specifically described herein, such as for example engine temperature.

I claim:

1. In an electrical control system of the automatically rebalancing type for controlling the speed of a rotating member wherein a direct current voltage proportional to the speed of the member and produced by a generator coupled to the member is continually compared with a reference voltage of selected magnitude, and any difference therebetween sensed to provide a voltage signal that is utilized to alter the speed of the member to restore balance between the two voltages, the improvement which consists in employing the output of a potentiometer as the reference voltage and connecting the potentiometer and field of the generator to the same source of voltage whereby any change in the voltage of the source is reflected equally in the output voltages of both the generator and the potentiometer.

2. In a system of speed control for an engine, in combination, means producing a speed voltage variable with the engine speed, means providing a reference voltage, means comparing said voltages to derive a signal voltage whose polarity and magnitude is determined by the sense and magnitude of the difference between said voltages, reversible means responsive to said signal voltage and actuated in one direction or the other dependent upon its polarity, a fuel control actuated by said reversible means for changing the rate of fuel admission to the engine, means actuated by said reversible means for producing a second reference voltage variable with the displacement of said reversible means, means comparing said second reference voltage with said speed voltage to derive a second signal voltage, means at the output of last said comparing means for passing said second signal voltage only when said second reference voltage exceeds said speed voltage, said passed second signal voltage having a polarity such as will effect a reduction in the rate of fuel flow to the engine, and means applying said passed second signal voltages to said reversible means.

3. In an electrical speed control of the automatically rebalancing type, means producing a voltage signal whose magnitude and polarity are determined by the magnitude and sense of the departure in speed of a rotating member from a given speed, an electrically controlled speed adjusting device for the member responsive to said signal for altering the speed of the member in such sense as to reduce the signal to zero, means controlled by an operating parameter of the rotating member other than speed for producing a second signal upon an increase in the magnitude of said other operating parameter above a preselected magnitude, and circuit means applying said second signal to said speed adjusting means, said second signal having a polarity such as to effect a reduction in speed of the rotating member.

4. In an electrical speed control of the automatically rebalancing type for a rotating member, means producing a voltage signal whose magnitude and polarity are determined by the magnitude and sense of the departure in speed of the rotating member from a given speed, an electrically controlled speed adjusting device for the member responsive to said signal for altering the speed of the member in such sense as to reduce the signal to zero, means controlled by temperature of the member for producing a second signal upon a rise in temperature of the member above a preselected maximum level, and circuit means applying said second signal to said speed adjusting device, said second signal having a polarity such as to effect a reduction in speed of the member.

5. In an electrical speed control of the automatically rebalancing type for a rotating member, means producing a voltage signal whose magnitude and polarity are determined by the magnitude and sense of the departure in speed of the member from a given speed, an electrically controlled speed adjusting device for the member responsive to said signal for altering the speed of the member in such sense as to reduce the signal to zero, means providing a second signal variable in accordance with the temperature of the member, said signal having a zero value at a preselected maximum temperature level and circuit means applying said second signal to said speed adjusting device when it is of polarity resulting from temperature above preselected maximum temperature level, and blocking said second signal when of reverse polarity, said second signal when applied having a polarity such as to effect a reduction in speed of the member.

6. In an electrical speed control of the automatically rebalancing type for a rotating member, means producing a voltage proportional to the speed of the member, means providing a reference voltage of a selected magnitude, means electrically combining said voltage to produce the difference therebetween, an electro-controlled speed adjusting device for the member responsive to the difference voltage for altering the speed of the member in such sense as to reduce the difference voltage to zero, a comparison circuit generating a voltage which varies in accordance with changes in magnitude of an operating parameter of the member other than speed, said comparison circuit being balanced at a predetermined magnitude level of the parameter, means in the output of said circuit for passing only such output voltages as are attributable to unbalance caused by a change in the magnitude of the parameter in a predetermined sense, and circuit means applying said passed output voltages to said speed adjusting device.

7. In a system of speed control for a rotary machine, in combination, means producing a speed voltage variable with the machine speed, means providing a reference voltage, means comparing said voltages to derive a signal voltage whose polarity and magnitude is determined by the sense and magnitude of the difference between said voltages, reversible means responsive to said signal voltage and actuated in one direction or the other dependent upon its polarity, means actuated by said reversible means for changing the speed of the machine, a temperature bridge including a temperature sensitive element as one branch thereof responsive to temperature of the machine, said bridge being balanced at a predetermined machine temperature limit, means in the output of said bridge for passing only those output voltages as are attributable to bridge unbalance caused by machine temperatures in excess of said temperature limit, said passed output voltage having a polarity such as will effect a reduction in speed of the machine, and means applying said output voltage to said reversible means.

8. In a system of speed control for a jet type engine in which the engine power is delivered rearwardly through an exhaust tail pipe, in combination, means producing a speed voltage variable with the engine speed, means providing a reference voltage, means comparing said voltages to derive a signal voltage whose polarity and magnitude is determined by the sense and magnitude of the difference between said voltages, reversible means responsive to said signal voltage and actuated in one direction or the other depending upon its polarity, means actuated by said reversible means for changing the speed of the engine, a temperature bridge including a temperature sensitive element as one branch thereof responsive to the temperature in the tail pipe, said bridge being balanced at a predetermined temperature limit in the tail pipe, means in the output of said bridge for passing only such output voltages as are attributable to bridge unbalance caused by tail pipe temperatures in excess of said temperature limit, said passed voltage having a polarity such as will effect a reduction in speed of the engine, and means applying said output voltage to said reversible means.

9. In a speed control for a rotating member, an electrically controlled speed adjusting device for the member, means providing a first electrical signal which is a function of one operating parameter of the member, means providing a second electrical signal which is a function of a second operating parameter of the member, connections between said signals and said speed adjusting device, and switching means in said connections for said signals controlled in accordance with the speed of the member, said switching means being actuated at a predetermined speed of the member to cut off said first signal from said speed adjusting device and simultaneously cut in said second signal.

10. In a speed control for a rotating member, means producing a first electrical signal which is a function of the speed of the member, means producing a second electrical signal which is a function of the acceleration of the member, an electro-controlled speed adjusting device for the member responsive to said signals, and switching means for said signals controlled in accordance with the speed of said member, said switching means being actuated at a predetermined speed of the member to cut off said first signal from said speed adjusting device and simultaneously cut in said second signal.

11. In a speed control for a rotating member, means providing a first electrical signal which is a function of one operating parameter of the member, means providing a second electrical signal which is a function of a second operating parameter of the member, an electrically controlled speed adjusting device for the member responsive to said signals, means producing a cross-over signal varying with speed of the member, and means controlled by said cross-over signal for blocking transmission of one of said signals to said speed adjusting device below a selected magnitude of said cross-over voltage and for similarly blocking transmission of the other of said signals above such magnitude of the cross-over voltage.

12. In a combined acceleration and speed control of the automatically rebalancing type for a rotating member, means producing a voltage proportional to the speed of the member, means producing a voltage proportional to the acceleration of the member, means providing a first reference voltage, means electrically combining said first reference and acceleration voltages to derive a first voltage signal, a second reference voltage, means electrically combining said second reference voltage and speed voltage to derive a second voltage signal proportional to their difference, an electro-controlled speed adjusting device for the member responsive to said signals, and switching means for said signals controlled in accordance with the speed of said member, said switching means being actuated at a predetermined speed of the member to cut off said first signal from said speed adjusting device and simultaneously cut in said second signal.

13. A control system as defined in claim 12 wherein said first reference voltage includes a voltage component increasing with speed of the rotating member so that the resultant acceleration increases with speed.

14. In a combined acceleration and speed control of automatically rebalancing type for a rotating member, means producing a voltage proportional to the speed of the member, means producing a voltage proportional to the acceleration of the member, means providing a first reference voltage, means electrically combining said first reference and acceleration voltages to derive a first voltage signal, a second reference voltage, means electrically combining said second reference voltage and speed voltage to derive a second voltage signal proportional to their difference, an electro-controlled speed adjusting device for the member responsive to said signals, circuit means combining said reference and speed voltages to produce a crossover voltage increasing with speed of the member, and signal blocking means controlled by said crossover voltage for blocking transmission of said second signal to said speed adjusting device below a selected magnitude of said crossover voltage and for similarly blocking transmission of said first signal above said voltage.

15. A combined acceleration and speed control as defined in claim 14 wherein said signal blocking means is constituted by a unidirectional conducting device in each signal circuit to which said crossover voltage is applied to render the said devices conductive and non-conductive, respectively, at the said selected magnitude of the crossover voltage.

16. In a combined acceleration and speed control for a rotating member, means producing a direct voltage proportional to the speed of the member, means dividing said voltage into speed voltages of opposite polarity, means producing first and second direct reference voltages, means differentiating one of said speed voltages, circuit means electrically combining said differentiated speed voltage with said first reference voltage and the other one of said speed voltages to produce a first voltage signal, means electrically combining said other speed voltage with said second reference voltage to produce a second voltage signal of opposite polarity to that of said first signal, a signal amplifier, a vibrator switch at the input to said amplifier for alternately connecting said first and second signals to the amplifier, a second vibrator switch at the amplifier output operated synchronously with said first switch for rectifying the amplified signals, said amplified signals being of like polarity, an electro-controlled speed adjusting device for said rotating member responsive to the rectified amplifier output signals, and switching means responsive to speed of the rotating member for cutting off said first signal at a predetermined speed of the member and simultaneously cutting in said second signal.

17. In a combined acceleration and speed control of the automatically rebalancing type for a rotating member, means producing a voltage proportional to speed of the member, means dividing said voltage into positive and negative speed voltages, means producing first and second reference voltages, means differentiating one of said speed voltages, circuit means electrically combining said differentiated speed voltage with said first reference voltage and the other of said speed voltages to produce a first voltage signal, circuit means combining the said other speed voltage with said second reference voltage to produce a second voltage signal having a polarity opposite to that of said first signal, a signal amplifier, a vibrator switch at the input to said amplifier for alternately connecting said first and second signals to the amplifier, a second vibrator switch at the amplifier output operated synchronously with said first switch for rectifying the amplified signals, said amplified signals being of like polarity, circuit means electrically combining one of said speed voltages with said reference voltage to produce a crossover voltage increasing with speed of the member, an electro-controlled speed adjusting device for the rotating member responsive to the amplified output signals, and signal blocking means controlled by said crossover voltage for blocking transmission of said second signal to said speed adjusting device below a selected magnitude of the crossover voltage and for similarly blocking transmission of said first signal above such voltage.

18. In a combined acceleration and speed control of the automatically rebalancing type for a rotating member, means producing a voltage proportional to the speed of the member, means dividing said voltage into positive and negative speed voltages, means producing first and second reference voltages, means differentiating said positive speed voltage, circuit means electrically combining said differentiated speed voltage with said first reference voltage and said negative speed voltage to produce a first voltage signal, circuit means combining said negative speed voltage with said second reference voltage to produce a second voltage signal having a polarity opposite to that of said first signal, a signal amplifier, a vibrator switch at the input to the amplifier for alternately connecting said first and second signals to the amplifier, a second vibrator switch at the amplifier output operated synchronously with said first switch for rectifying the amplified signals, said amplified signals being of like polarity, circuit means electrically combining one of said speed voltages with said reference voltage to produce a cross-over voltage increasing with speed of the member, signal blocking means controlled by said cross-over voltage at the amplifier input for blocking transmission of said second signal below a selected magnitude of the cross-over voltage and for similarly blocking transmission of said first signal above such voltage, and an electro-controlled speed adjusting device for the rotating member responsive to the rectified output signals.

19. In an electrical control system, the combination comprising a pair of input circuits each adapted to have impressed thereon a signal voltage, and switching means connected in each of said circuits to control passage of the signal voltage therethrough, said switching means being arranged upon application thereto of a variable control voltage to pass one of said signal voltages and block the other in accordance with the instantaneous value of said control voltage.

20. In an electrical control system, the combination comprising a pair of input circuits each adapted to have impressed thereon a signal voltage having a pulsating characteristic, and rectifiers individual to and connected in each of said input circuits, said rectifiers being arranged for conduction alternatively upon application thereto of a common variable control voltage to pass one or the other of said signal voltages.

21. In an electrical control system, the combination comprising a pair of input circuits each adapted to have impressed thereon a signal voltage having a pulsating characteristic, and rectifiers connected in each of said input circuits, said rectifiers being oppositely poled and alternatively conductive upon application thereto of a common control voltage of reversible polarity to thereby pass one or the other of said signal voltages.

22. In an electrical control system, the combination comprising a pair of input circuits each adapted to have impressed thereon a direct signal voltage, an amplifier for said voltages, said amplifier including synchronously actuated interrupter means at the input and output sides thereof for respectively converting the signal voltages applied to said input circuits from direct to pulsating at the amplifier input and reconverting the same from pulsating to direct at the amplifier output, and rectifier means connected in circuit with each of said signal voltages between the input and output interrupter means of said amplifier, said rectifiers being arranged for conduction alternatively upon application thereto of a common variable control voltage to pass one of said pulsating signal voltages and simultaneously block the other.

23. In an electrical control system, the combination comprising a pair of input circuits each adapted to have impressed thereon a direct signal voltage, an amplifier for said voltages, said amplifier including synchronously actuated interrupter means at the input and output sides thereof for respectively converting the signal voltages applied to said input circuits from direct to pulsating at the amplifier input and reconverting the same from pulsating to direct at the amplifier output, and rectifier means connected in circuit with each of said signal voltages between the input and output interrupter means of said amplifier, said rectifiers being oppositely poled and alternatively conductive upon application thereto of a common control voltage of reversible polarity to thereby pass one of said pulsating signal voltages and simultaneously block the other.

24. In an electrical control system, the combination comprising a pair of input circuits each adapted to have impressed thereon a direct signal voltage, an amplifier for said voltages, said amplifier including synchronously actuated interrupter means at the input and output sides thereof for respectively converting said signal voltages from direct to pulsating at the amplifier input and reconverting said voltages from pulsating to direct at the amplifier output, and a signal selector for blocking transmission of one or the other of said signal voltages through said amplifier, said signal selector including rectifiers individual to and connected in each of said input circuits on the amplifier side of said input interrupter means and which are oppositely poled for conduction alternatively upon application thereto of a common control voltage of reversible polarity to thereby pass one or the other of said pulsating input voltages.

25. In a speed control of the null-seeking type for an engine, means providing first and second signals which vary respectively in accordance with different parameters of engine operation, a cross-over control for selecting one or the other of said signals, a device actuated by the selected signal for adjusting the fuel flow to the engine in such manner as will tend to nullify the selected signal, and means responsive upon attainment of a preassigned condition of engine operation for actuating said cross-over control to cut off one of said signals from said fuel flow adjusting device and cut in the other signal to said device.

*26. A control mechanism for the fuel system or an engine comprising a fuel device in the system, means for establishing a reference voltage signal corresponding to a preselected engine speed, means for establishing a voltage signal corresponding to actual engine speed, a rate circuit having an output voltage signal proportional to the rate of change of engine speed and connected to said second named means in a manner to modify its voltage signal, means for establishing a reference voltage signal corresponding to a preselected engine temperature, means for establishing a voltage signal corresponding to actual engine temperature, a rate circuit having an output voltage signal proportional to the rate of change of*

*engine temperature, and means including an amplifier connected to said fuel device and into which said signals are fed in a manner to continuously control the fuel device.*

*27. A control mechanism for the fuel system of an engine comprising a fuel device in the system, means for establishing a reference voltage signal corresponding to a preselected engine speed, means for establishing a voltage signal corresponding to actual engine speed, a rate circuit having an output voltage signal proportional to the rate of change of engine speed and connected to said second named means in a manner to modify its voltage signal, a comparing circuit to which said modified actual engine speed voltage signal and said preselected engine speed voltage signals are connected to provide an output voltage signal whose phase and amplitude vary as a function of the relative magnitudes of said latter signals, means for establishing a reference voltage signal corresponding to preselected engine temperature, means for establishing a voltage signal corresponding to actual engine temperature, a rate circuit having an output voltage signal proportional to the rate of change of engine temperature, and means including an amplifier connected to said fuel device and having an input provided by the output of said comparing circuit and the temperature voltage signals.*

*28. A control mechanism for the fuel system of an engine comprising a fuel device in the system, means for establishing an electrical signal corresponding to an engine condition to be sensed, means for establishing a reference electrical signal representing a prescribed value of said engine condition, a rate circuit having an output signal proportional to the rate of change of said engine*

*condition and connected in relationship to said first named signal to modify the same, means for establishing an electrical signal corresponding to a second engine condition to be sensed, means for establishing a reference electrical signal corresponding to a prescribed value of said second engine condition, a rate circuit having an output signal proportional to the rate of change of said second engine condition, and means including an amplifier connected to said fuel device and into which said signals are fed in a manner to continuously control the fuel device.*

References Cited in the file of this patent or the original patent

UNITED STATES PATENTS

| | | |
|---|---|---|
| 746,047 | Dodge | Dec. 8, 1903 |
| 1,187,795 | Trettin | June 20, 1916 |
| 1,580,368 | Boddie | Apr. 13, 1926 |
| 1,686,792 | Black | Oct. 9, 1928 |
| 1,743,545 | Helpbringer | Jan. 14, 1930 |
| 1,751,225 | Ashbaugh | Mar. 18, 1930 |
| 2,247,166 | Edwards et al. | June 24, 1941 |
| 2,336,232 | Doran | Dec. 7, 1943 |
| 2,428,702 | Elliot | Oct. 7, 1947 |
| 2,442,300 | Liston | May 25, 1948 |
| 2,492,472 | Fortescue | Dec. 27, 1949 |

OTHER REFERENCES

"Theory of Servo Systems With Particular Reference to Stabilization," by A. L. Whiteley, pages 601–603, Journal of Electrical Engineers, December 1946.

"Differentiating and Integrating Circuits," by James G. Clarke, pages 138–142, Electronics, November 1944.